United States Patent
Park et al.

(10) Patent No.: US 7,644,243 B2
(45) Date of Patent: Jan. 5, 2010

(54) RECORDING MEDIUM, METHOD AND APPARATUS FOR RECORDING ON RECORDABLE RECORDING MEDIUM, AND METHOD FOR MANAGING BACKUP FILES OF THE SAME

(75) Inventors: Sung Wan Park, Suwon-si (KR); Kang Soo Seo, Anyang-si (KR); Byung Jin Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 641 days.

(21) Appl. No.: 11/077,140

(22) Filed: Mar. 11, 2005

(65) Prior Publication Data
US 2005/0201731 A1 Sep. 15, 2005

Related U.S. Application Data

(60) Provisional application No. 60/552,396, filed on Mar. 12, 2004.

(30) Foreign Application Priority Data
Mar. 9, 2005 (KR) .................. 10-2005-0019509

(51) Int. Cl.
*G06F 13/00* (2006.01)
(52) U.S. Cl. .................. 711/162; 707/204
(58) Field of Classification Search .......... 711/162; 707/204
See application file for complete search history.

(56) References Cited

U.S. PATENT DOCUMENTS

| 7,003,711 | B2 * | 2/2006 | Noda et al. ............ 714/755 |
| 7,107,419 | B1 * | 9/2006 | Ghemawat et al. ........ 711/162 |
| 7,328,366 | B2 * | 2/2008 | Michelman ............... 714/6 |
| 2002/0025138 | A1 * | 2/2002 | Isobe et al. ............. 386/95 |
| 2002/0064374 | A1 | 5/2002 | Ando et al. |
| 2003/0059210 | A1 * | 3/2003 | Ando et al. ............. 386/98 |
| 2003/0101861 | A1 * | 6/2003 | Taira et al. ............. 84/602 |
| 2005/0108466 | A1 * | 5/2005 | Takashima et al. ....... 711/100 |

FOREIGN PATENT DOCUMENTS

| EP | 0 977 121 | | 2/2000 |
| EP | 1 280 347 A1 | | 1/2003 |
| EP | 1 515 337 | | 3/2005 |
| KR | 2001-0054092 A | | 7/2001 |

(Continued)

OTHER PUBLICATIONS

International Search Report issued Nov. 3, 2005 in corresponding International Patent Application No. PCT/KR2005/000670.

(Continued)

*Primary Examiner*—Christian P Chace
*Assistant Examiner*—Jared I Rutz
(74) *Attorney, Agent, or Firm*—Harness, Dickey & Pierce

(57) ABSTRACT

A method and apparatus for managing backup files corresponding to original files. The method and apparatus includes recording backup files where an optical recording apparatus is and is not originally configured to be able to record and manage backup files. Accordingly, more reliable management files can be provided, thereby allowing recording and reproducing of an optical disc to be performed with greater efficiency.

8 Claims, 6 Drawing Sheets

FOREIGN PATENT DOCUMENTS

| | | |
|---|---|---|
| KR | 2001-0054379 A | 7/2001 |
| WO | WO 99/09480 | 2/1999 |

OTHER PUBLICATIONS

"80 mm (1,46 Gbytes per side) and 120 mm (4,70 Gbytes per side) DVD Re-Recordable Disk (DVD-RW)," ECMA Standardizing Information and Communication Systems, Standard ECMA-338, Dec. 2002.

Office Action issued Jul. 16, 2009 by the Russian Patent Office in counterpart Russian Patent Application No. 2006136030/28 (with English language translation).

Notice of Allowance for Russian patent application No. 2006136030 dated Sep. 24, 2009.

* cited by examiner

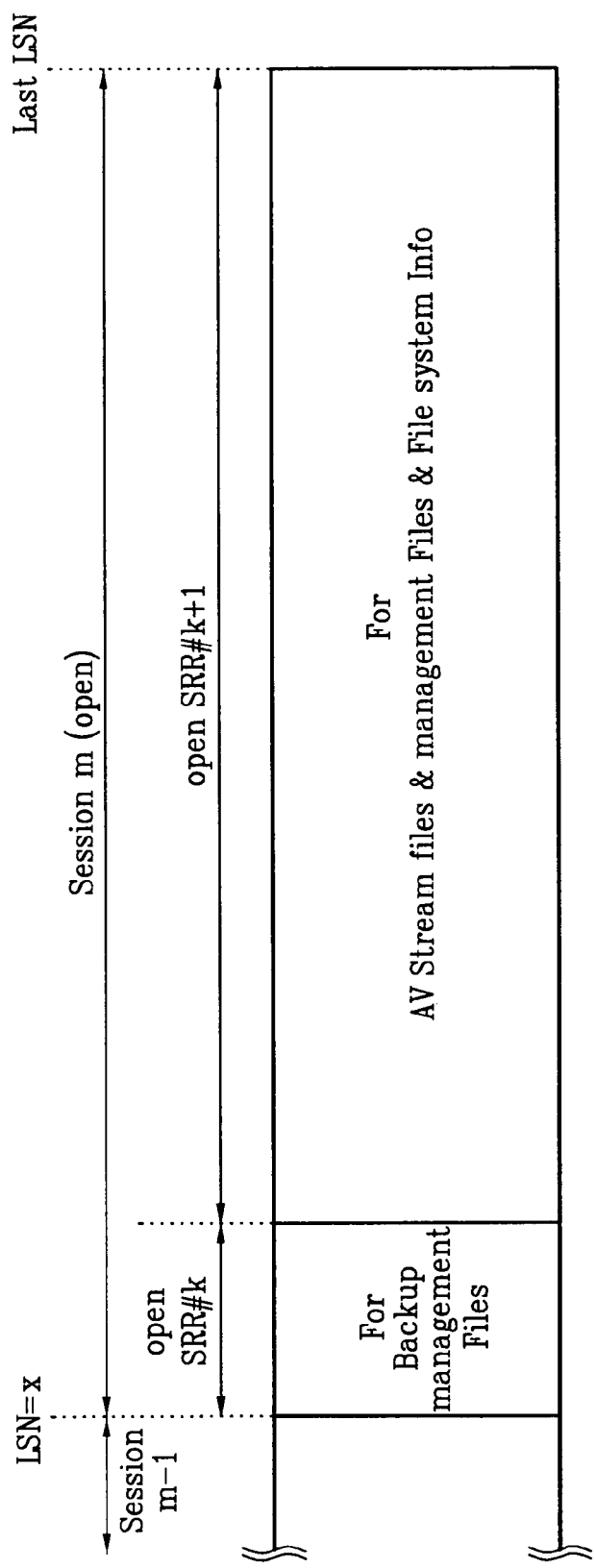

RECORDING MEDIUM, METHOD AND APPARATUS FOR RECORDING ON RECORDABLE RECORDING MEDIUM, AND METHOD FOR MANAGING BACKUP FILES OF THE SAME

This application claims the benefit of the U.S. Provisional Application No. 60/552,396, filed on Mar. 12, 2004, in the name of inventors Sung Wan PARK, Kang Soo SEO, and Byung Jin KIM, entitled "BACKUP FILE TREATMENT RULE OF OPTICAL DISC", which is hereby incorporated by reference as if fully set forth herein.

This application claims the benefit of the Korean Application No. 10-2005-0019509, filed on Mar. 9, 2005 which is hereby incorporated by reference as if fully set forth herein.

BACKGROUND OF THE INVENTION

1. Field of the Invention

The present invention relates to a method for recording and managing files within a recording medium, and more particularly, to a recording medium, a method and apparatus for recording on a recordable recording medium, and a method for managing backup files of the same. Although the present invention is suitable for a wide scope of applications, it is particularly suitable for recording and managing original files and back-up files at the same time within the recording medium.

2. Discussion of the Related Art

Optical discs are widely used as a recording medium for recording mass data. Presently, among a wide range of optical discs, a new high-density optical recording medium, such as a Blu-ray Disc (hereinafter referred to as "BD"), is under development for writing and storing high definition video and audio data. Currently, global standard technical specifications of the Blu-ray Disc (BD), which is known to be the next generation technology, are under establishment as a next generation optical recording solution that is able to record and store data significantly surpassing the conventional DVD, along with many other digital apparatuses. Accordingly, methods for managing files of a recordable blu-ray disc (BD-RE/R) in a BD standard are currently under discussion. However, since the Blu-ray Disc (BD) standards are yet to be completed, there have been many difficulties in developing a complete optical reproducing apparatus.

SUMMARY OF THE INVENTION

Accordingly, the present invention is directed to a recording medium, a method and apparatus for recording on a recording medium, and a method for managing backup files of the same that substantially obviate one or more problems due to limitations and disadvantages of the related art.

An object of the present invention is to provide a method and apparatus for recording and managing files within a recordable recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for recording on a recordable recording medium includes recording original stream files and original management files in a specific area on the recording medium, and recording backup management files corresponding to the original management files in another specific area on the recording medium.

In another aspect of the present invention, in a method for managing backup files corresponding to original files, a method for managing backup files of a recording medium includes, when an optical recording and reproducing apparatus is able to record and manage backup files, first recording backup files if a back up file does not exist within the recording medium, and performing recording and reproducing operations, and, when an optical recording and reproducing apparatus is unable to record and manage backup files, first deleting backup files if one or more backup files exist within the recording medium, and performing recording and reproducing operations.

In another aspect of the present invention, in a method for managing backup files corresponding to original files, a method for managing backup files of a recording medium includes, when an optical recording and reproducing apparatus is able to record and manage backup files, and if a command for modifying or deleting the original files within the recording medium is received, modifying or deleting backup files corresponding to the original files, and, when an optical recording and reproducing apparatus is unable to record and manage backup files, and if a command for modifying or deleting the original files within the recording medium is received, deleting backup files corresponding to the original files.

In another aspect of the present invention, an apparatus for recording on a recordable recording medium includes a controller pre-allocating at least two recording areas for recording original stream files, original management files, and backup management files, and transmitting a recording command for recording data within a corresponding area, and a recording and reproducing device recording data within the corresponding allocated area, in accordance with the recording command of the controller, wherein the original stream files and the original management files are first recorded and the backup management files are recorded thereafter.

In another aspect of the present invention, an apparatus for recording on a recordable recording medium includes a controller verifying whether original files and backup files corresponding to the original files exist within the recording medium, and controlling recording of the backup files if backup files does not exist, and a recording and reproducing device recording the backup files on a predetermined area of the recording medium, in accordance with the control of the controller.

In another aspect of the present invention, an apparatus for recording on a recordable recording medium includes a controller verifying whether original files and backup files corresponding to the original files exist within the recording medium, and controlling operations so that the backup files are deleted, if the backup files exist, and a recording and reproducing device deleting the backup files in accordance with the control of the controller.

In a further aspect of the present invention, a recording medium includes an area for recording original management files, an area for recording original stream files, and an area for recording backup management files that correspond to the original management files.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 2A and 2B illustrate a method for recording files on the recordable recording medium according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium. An "original file" refers to an essential file that must be included among the files being recorded on the optical disc. A "backup file" refers to a partial or full copy version of the original file. The backup file may be included optionally within the optical disc. The original file and the backup file will be described in detail with reference to FIG. 1.

Additionally, in the present invention, a "file system" refers to a set of information not only managing a logical structure (hereinafter referred to as a "Disc Volume") of the entire optical disc, but also managing all of the files recorded within the optical disc. Herein, such information is only recognized by the system and not recognized by the user. Therefore, in the present invention, a "File System Information" refers to diverse information creating the file system. Such file system information includes a "volume structure", an "anchor", a "Metadata (MD) file", and a "Metadata (MD) file entry (FE)". The volume structure and the anchor pointer represent the structure of the entire disc volume. The metadata (MD) file includes locations and attributes of the files recorded within the disc, and the metadata file entry represents the location of the metadata file. Furthermore, when the metadata file is scattered within the disc, a "Metadata (MD) partition map" is included in the metadata file entry.

Figure 1:
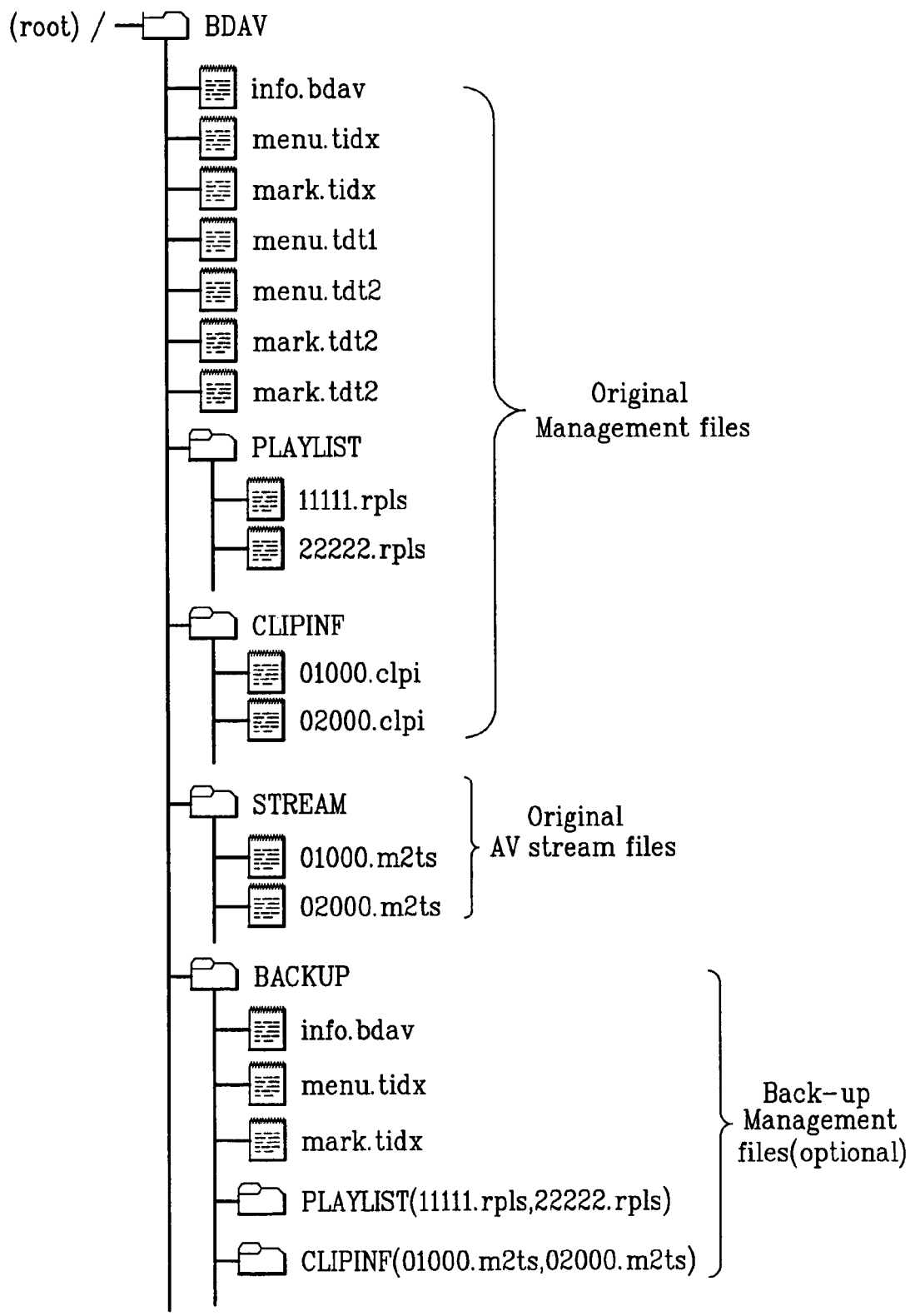
FIG. 1 illustrates a file structure of a recordable recording medium according to the present invention.

FIG. 1 illustrates a file structure of a recordable recording medium according to the present invention. The file structure that can be applied to a recordable optical disc according to the present invention includes at least one BD directory (BDAV), which is included in a root directory (root). Each BD directory includes an info file (info.bdav), menu files (menu.tidx, menu.tdt1, menu.tdt2), and mark files (mark.tidx, mark tdt1, mark.tdt2), which are used for interacting with one or more users. Each BD directory further includes four file directories that include information for reproducing and managing data recorded in an actual disc and information on methods for reproducing data. The file directories included in each BD directory are a stream directory (STREAM), a clip information directory (CLIPINF), a playlist directory (PLAYLIST), and a backup directory (BACKUP).

Each of the directories and file attributes will now be described in detail. First of all, the stream directory (STREAM) includes audio/video (AV) stream files (01000.m2ts, 02000.m2ts) having a particular data format, and each stream file (01000.m2ts, 02000.m2ts) represents AV data (or PC data) recorded on a specific area within the optical disc. Next, the clip information directory (CLIPINF) includes clip information files that correspond to the stream files (AV or text subtitle) included in the stream directory, respectively. Each clip information file contains property and reproduction timing information of a corresponding stream file. More specifically, the stream file (*.m2ts) and the clipinfo file (*.clpi), which are in one-to-one correspondence, are collectively referred to as a "clip". For example, 01000.clpi included in CLIPINF includes property information of 01000.m2ts included in STREAM, and 01000.clpi and 01000.m2ts form a clip.

Referring back to FIG. 1, the playlist directory (PLAYLIST) includes one or more PlayList files (*.rpls), where each PlayList file includes at least one PlayItem that performs reproduction of a specific clip. Therefore, a PlayList file (*.rpls) refers to a basic reproduction management file performing reproduction of a combination of desired clips by a combination of at least one PlayItem. In other words, in the above-described file structure, the stream files included in the stream directory (STREAM) refers to files (AV stream files) having actual user data recorded therein. Other directories and files are described as management files including reproduction management information for reproducing the stream files.

Therefore, when using the file structure according to the present invention, the management file being recorded within the disc includes an "original management file" and a "backup management file". In addition, since the management files are indispensable information for reproducing the stream files, the management files require a highly reliable protective solution. Therefore, a backup directory (BACKUP) is provided under the BDAV directory. And, management files for backup usage may be optionally recorded within the backup directory. More specifically, the optional recording of the backup directory is characteristic of the present invention, which is to provide flexibility in the development of the optical recording and reproducing apparatus. Therefore, it is apparent that an optical recording and reproducing apparatus that can record and manage a backup directory and an optical recording and reproducing apparatus that cannot record or manage a backup directory each has a different method for recording and managing a backup directory. This will be described in more detail with reference to FIGS. 4A and 4B.

Additionally, in creating backup management files configuring the backup directory, either the entire original management file is created or only a portion of the original management file is created. FIG. 1 illustrates a preferred example of creating backup management files with the original management files, with the exception of "menu.tdt1", "menu.tdt2", "mark.tdt1", and "mark.tdt2". Also, the backup file is given the same file name as its corresponding original file, and a BACKUP directory is created under the BDAV directory. Therefore, when a plurality of BDAV directories is created within an optical disc, a plurality of corresponding BACKUP directories is also created accordingly.

Figure 2B:
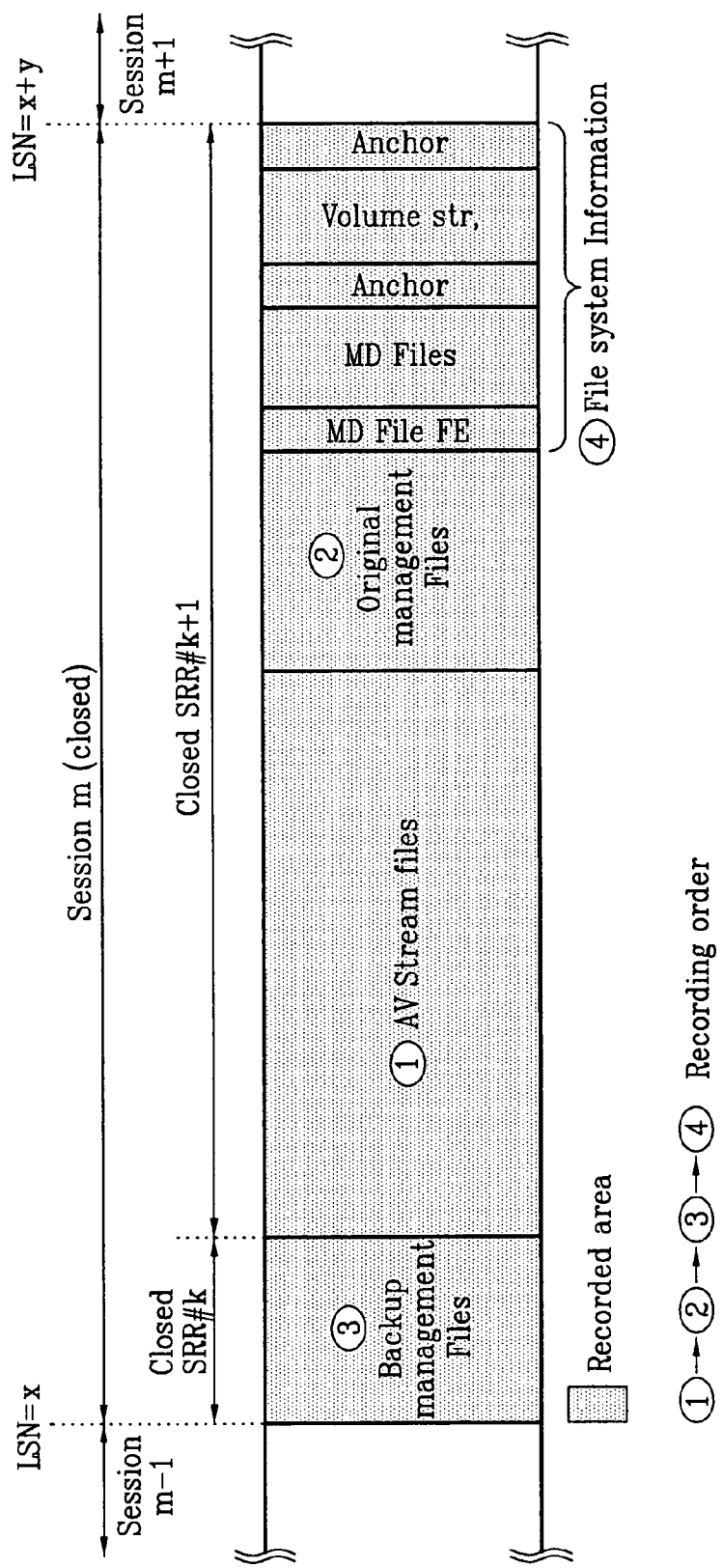

FIGS. 2A and 2B illustrate a method for recording files on the recordable recording medium according to the present invention. Most particularly, FIGS. 2A and 2B illustrate an example of a write-once recordable optical disc (e.g., blu-ray disc (BD-R)). Accordingly, the method for recording files according to the present invention has the following characteristics. First of all, an optical recorder first records a set of original files and, then, records corresponding backup files. The priority of this process is determined depending upon the importance of the corresponding original file. Secondly, an area for recording the backup files should be separately provided within the optical disc. For example, in case of a rewritable optical disc, an original file recording area and a backup file recording area should be separately allocated within a predetermined file information recording area. Further, in case of a write-once optical disc, a backup file recording area should be separately allocated within a data area, as shown in FIG. 2A.

FIG. 2A illustrates a method for recording files in a write-once optical disc, wherein a structure of a recording area for each file is allocated prior to recording the data within the optical disc. For example, FIG. 2A illustrates a method for recording data on a specific session (session #m) within a write-once optical disc. And, it is apparent that each session is recorded by using the same method.

In the embodiment of the present invention, the data recording area is pre-allocated with a first area and a second area. The first area is for recording backup management files, and the second area is for recording stream files, original management files, and file system information. More specifically, by creating the backup management files to be located at a location spaced apart from the location where the original management files are recorded, the object of protecting the management files can be achieved. Each of the allocated area, as described above, is referred to as a "Sequential Recording Range (SRR)". Most particularly, a recordable SRR is referred to as an "Open SRR", and a non-recordable SRR is referred to as a "Closed SRR".

Referring to FIG. 2A, two open SRRs are allocated, wherein Open SRR #k is used as an area for recording backup management files, and Open SRR #k+1 is used as an area for recording stream files, original management files, and file system information. In addition, when allocating backup Open SRR #k, the allocated size of a corresponding area should be decided by predicting the size of the original management files. For example, a write-once blu-ray disc (BD-R) includes a maximum of 200 PlayList files (*.rpls) which equals to about 13 Kbytes, a maximum of 200 ClipInfo files (*.clpi) which amounts to about 1 Mbyte, and a file including diverse other info files (info.bdav) which equals to a maximum of 12 Kbytes. Taking into account the above estimated file size, the required overall file size can be predicted to be 1.046 Mbytes. However, considering possible defects in the corresponding area, it is preferable to add 10% to 20% of surplus size, which amounts to approximately 1.2 Mbytes.

FIG. 2B illustrates an example of a method for recording actual data of the first area (Open SRR #k) and the second area (Open SRR #k+1), as shown in FIG. 2A. More specifically, the stream files which the user wishes to be recorded are first recorded in SRR #k+1, and, subsequently, when the recording of the stream files is completed, the original management files are recorded as management files that reproduce the recorded stream files in continuation with the recorded stream files. Thereafter, the backup management files are recorded in the SRR #k, and the file system information is recorded in SRR #k+1 in continuation with the recorded original management files. Herein, the recording order is marked in numbers, as shown in FIG. 2B, for simplicity of the description.

As described above, the metadata files, the metadata file entry, the anchor, and the volume structure are recorded in the file system information. Also, after recording the file system information, it is preferable to change the recordable areas SRR #k and SRR #k+1 into non-recordable areas, (i.e., Closed SRRs). This is to prepare for unexpected situations caused by a system error, for example, after the file system information is validly recorded. In other words, data can be validly recovered from the Closed SRR in which the file system information is recorded even when unexpected accidents occur. Furthermore, when a corresponding session #m is closed, all of the SRRs existing within the session are closed as well. And, thereafter, data can no longer be recorded in the corresponding session, and future recording of data should be performed by allocating a new open session (session #m+1). At this point, the recording method used herein is identical to the recording method used in session #m, wherein Open SRRs are allocated for recording the backup management files.

Figure 3:
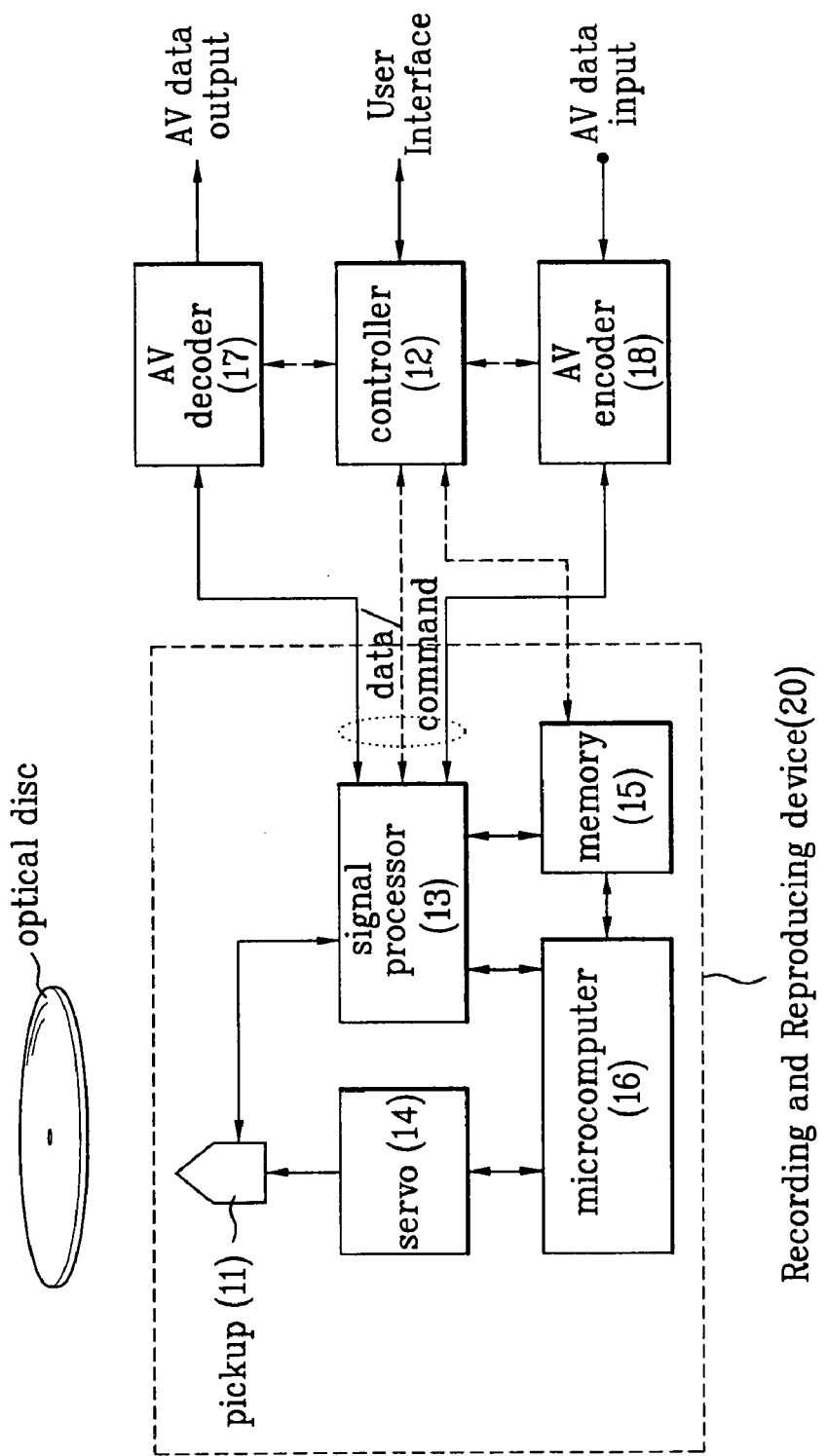
FIG. 3 illustrates an optical recording and reproducing apparatus according to the present invention.

Hereinafter, an optical recording and reproducing apparatus according to the present invention and a method for managing optical disc files using the same will now be described with reference to FIGS. 3, 4A, and 4B. FIG. 3 illustrates an optical recording and reproducing apparatus according to the present invention. The optical recording and reproducing apparatus basically includes a pick-up unit 11 for reading data and management information recorded on the optical disc, a servo 14 controlling the operations of the pick-up unit 11, a signal processor 13 either recovering the reproduction signal received from the pick-up unit 11 to a desired signal value, or modulating a signal to be recorded to an optical disc recordable signal and transmitting the modulated signal to the pick-up unit 11, a memory 15 for temporarily storing the management information read from the optical disc, and a microcomputer 16 controlling the above operations. This basic structure is referred to as a recording and reproducing device 20, which may also be referred to as a "drive".

Also, a controller 12 controls the overall operation of the optical recording and reproducing apparatus. The controller 12 receives a user command through a user interface and transmits the received user command to the microcomputer 16, so that operation of the apparatus can be controlled in accordance with the user command. Most particularly, the controller 12 uses the disc management information transmitted from the recording and reproducing device 20 and created a recording and reproducing command. Thereafter, the controller 12 transmits the command back to the recording and reproducing device 20.

In addition, an AV decoder and text subtitle (Text ST) decoder 17 performs final decoding of output data in accordance with the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13. More specifically, when a re-writable optical disc is loaded, the controller 12 controls the apparatus so that each of the stream files, the original management files, and the backup management files are respectively recorded in the pre-determined file information recording area and the user data recording area within the optical disc.

Furthermore, when a write-once optical disc is loaded, the controller 12 pre-allocates at least 2 areas for recording the stream files, the management files, and the file system information. In the preferred embodiment of the present invention (shown in FIG. 2A), two Open SRRs (Open SRR #k and Open SRR #k+1) are allocated. Subsequently, the controller 12 transmits a recording command corresponding to the data, which are to be recorded in each of the allocated areas, to the recording and reproducing device 20. Then, after receiving the recording command, the recording and reproducing device 20 operates the pick-up unit 11 by using the servo 14 and completes the recording of the original data within the area requested by the controller 12. Thereafter, the original management files, the backup management files, and the file system information are recorded in series.

Figure 4A:
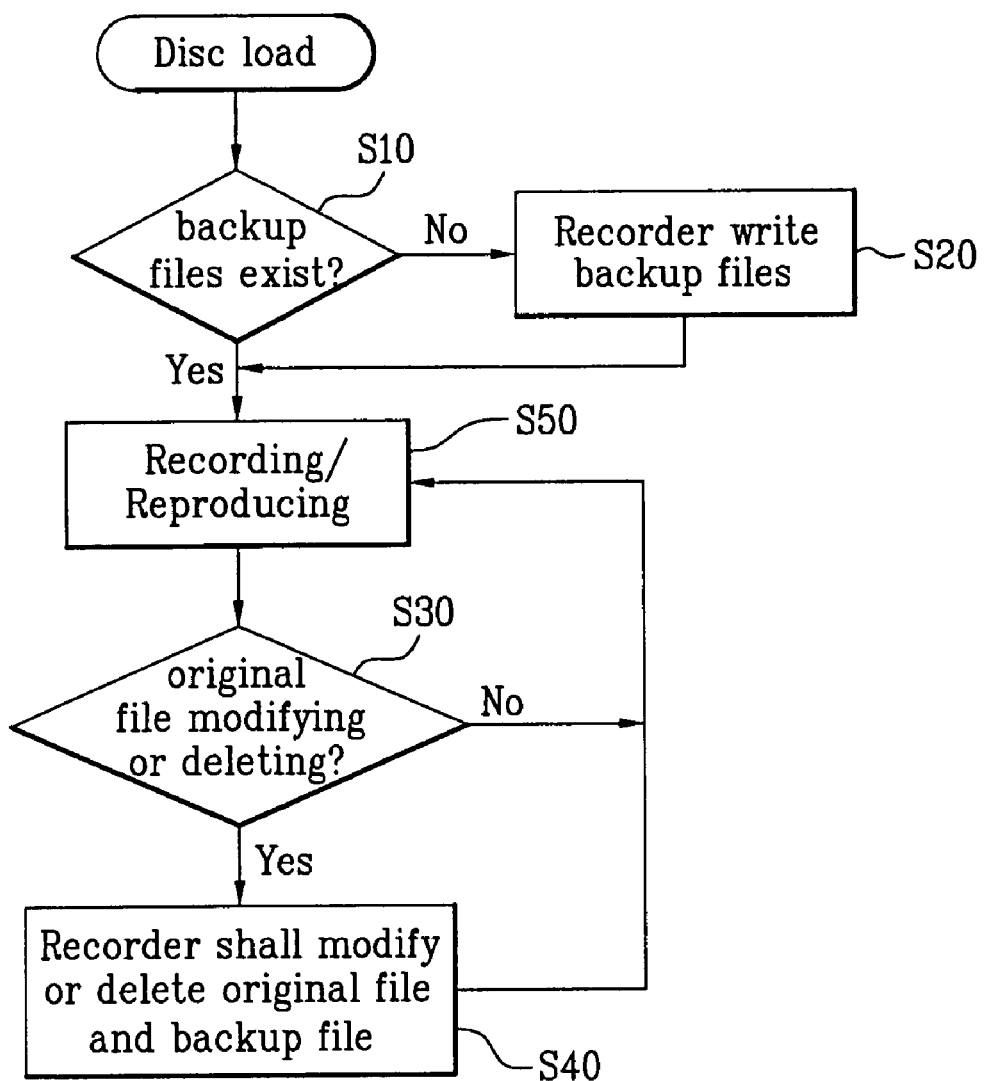
FIGS. 4A and 4B illustrate a method for managing files according to the present invention.
Figure 4B:
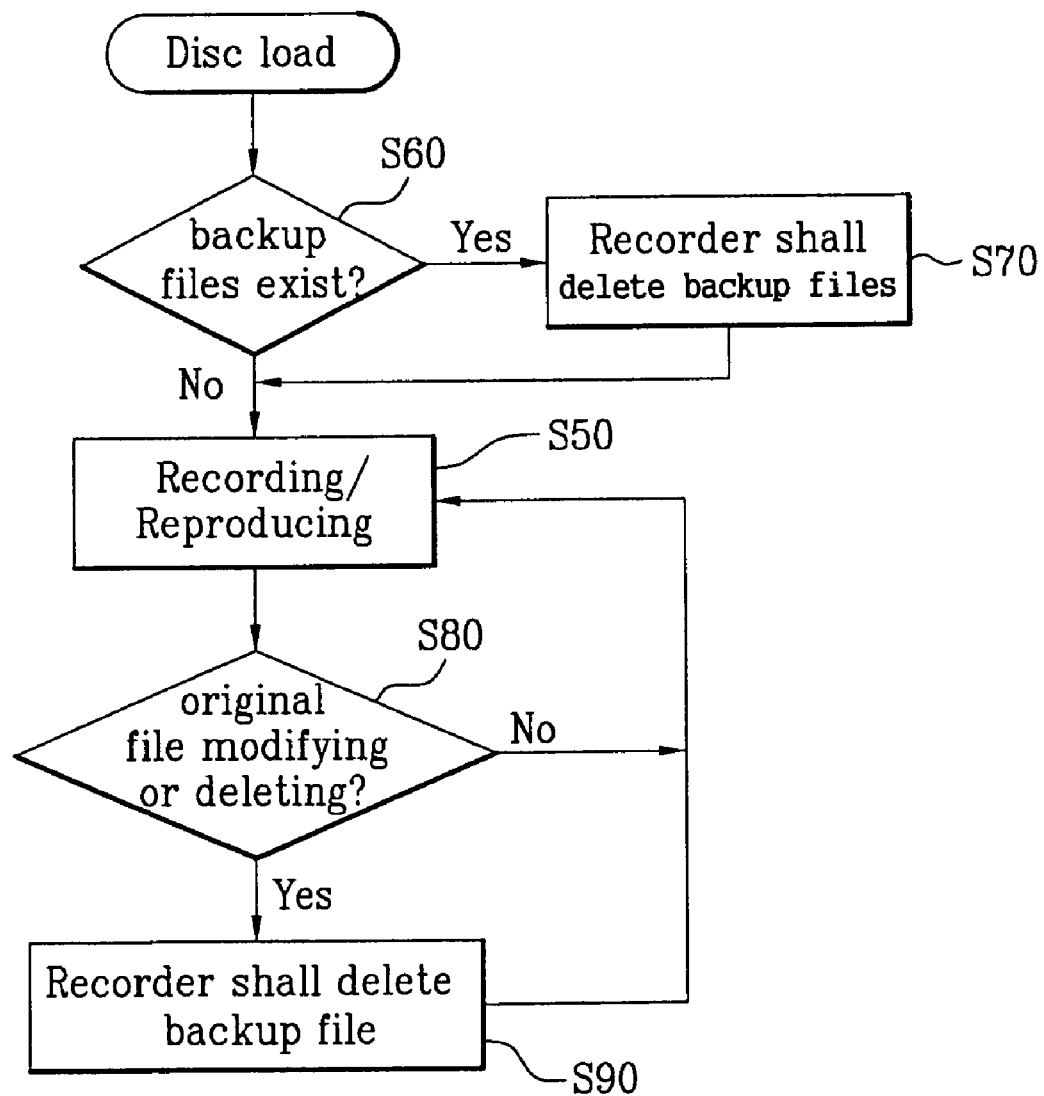

FIGS. 4A and 4B illustrate a method for controlling files according to the present invention. More specifically, FIG. 4A illustrates an example when the optical recording and reproducing apparatus is able to record and manage backup files, and FIG. 4B illustrates an example when the optical recording and reproducing apparatus is unable to record and manage the backup files.

Referring to FIG. 4A, when the optical disc is loaded, as an initial step, the apparatus verifies whether a backup file exists within the optical disc (S10). If a backup file does not exist, the optical recording and reproducing apparatus records the backup file in a predetermined area (S20). Subsequently, the apparatus performs a specific function, such as a recording (or writing) operation or a reproducing (or reading) operation (S50). Furthermore, when the apparatus receives a command requesting the original file to be deleted (S30), the optical recording and reproducing apparatus should delete the original file as well as the corresponding backup file (S40). After the completion of the above described step, the apparatus performs a specific function, such as a recording operation or a reproducing operation (S50).

Referring to FIG. 4B, when the optical disc is loaded, as an initial step, the apparatus verifies whether a backup file exists within the optical disc (S60). If a backup file exists, the optical recording and reproducing apparatus deletes the backup file that is recorded within the optical disc (S70). Subsequently, the apparatus performs a specific function, such as a recording (or writing) operation or a reproducing (or reading) operation (S50). Furthermore, when the apparatus receives a command requesting the original file to be modified or deleted (S80), the optical recording and reproducing apparatus should delete the backup file corresponding to the original file (S90). After the completing the above described step, the apparatus performs a specific function, such as a recording operation or a reproducing operation (S50).

When comparing the apparatus of FIG. 4A with the apparatus of FIG. 4B, the optical recording and reproducing apparatus that can manage backup files (shown in FIG. 4A) records and manages the backup file corresponding to the original file recorded within a specific area of the loaded disc by using the same method as that used for the original file. On the other hand, the optical recording and reproducing apparatus that is unable to manage backup files (shown in FIG. 4B) deletes the backup file recorded in a specific area of the loaded disc, thereby preventing system errors caused by existing backup files from occurring during future usage.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In a method for managing backup files corresponding to original files, a method for managing backup files of a recording medium, comprises:
   in case of an optical recording apparatus is originally configured to be able to record and manage backup files, recording backup files if a back up file corresponding to an original file does not exist within the recording medium when the recording medium is loaded on the optical recording apparatus; and
   in case of an optical recording apparatus is originally configured to be unable to record and manage backup files, deleting a backup file corresponding to an original file if the backup file corresponding to the original file exists within the recording medium when the recording medium is loaded on the optical recording apparatus.

2. The method of claim 1, the method further comprising:
   in case of the optical recording apparatus is originally configured to be able to record and manage backup files, recording the backup file onto a sequential recording range allocated apart from a sequential recording range storing the original file.

3. The method of claim 1, wherein in case of the optical recording apparatus is originally configured to be unable to record and manage backup files, the backup file is deleted from the recording medium when the original file is to be modified or deleted.

4. In a method for managing backup files corresponding to original files, a method for managing backup files of a recording medium, comprises:
   in case of an optical recording and reproducing apparatus is originally configured to be able to record and manage backup files, and when an original file within the recording medium is modified or deleted, modifying or deleting a backup file corresponding to the original file; and
   in case of an optical recording and reproducing apparatus is originally configured to be unable to record and manage backup files, and when an original file within the recording medium is modified or deleted, deleting a backup file corresponding to the original file.

5. In an apparatus for managing backup files corresponding to original files, an optical recording apparatus for managing backup files of a recording medium, the optical recording apparatus being originally configured to be able to record and manage backup files, comprises:
   a pickup configured to record data on the recording medium; and
   a controller configured to determine whether the recording medium is loaded, and to verify whether a backup file corresponding to an original file exists within the loaded recording medium; create the backup file corresponding to the original file if the backup file corresponding to the original file does not exist within the loaded recording medium; and control the pickup to record the backup file in the loaded recording medium.

6. The apparatus of claim 5, wherein if the original file is to be modified or deleted, the controller is configured to modify the backup file in accordance with the modified original file or control the pickup to delete the backup file as well as the original file.

7. In an apparatus for managing backup files corresponding to original files, an optical recording apparatus for managing backup files of a recording medium, the optical recording apparatus being originally configured to be unable to record and manage backup files, comprises:

a pickup configured to record data on the recording medium; and a controller configured to determine whether the recording medium is loaded, and to control the pickup to delete a backup file corresponding to an original file if the backup file corresponding to the original file exists within the loaded recording medium.

8. In an apparatus for managing backup files corresponding to original files, an optical recording apparatus for managing backup files of a recording medium, the optical recording apparatus being originally configured to be unable to record and manage backup files, comprises:

a pickup configured to record data on the recording medium; and a controller configured to determine whether the recording medium is loaded, and to control the pickup to delete a backup file corresponding to an original file if the original file is to be modified or deleted from the loaded recording medium.

* * * * *